United States Patent [19]

Lunick

[11] 4,356,967

[45] Nov. 2, 1982

[54] LABORATORY INCUBATOR CHAMBER SYSTEM

[75] Inventor: Harold L. Lunick, Lansdale, Pa.

[73] Assignee: Lunaire Environmental, Inc., Williamsport, Pa.

[21] Appl. No.: 187,093

[22] Filed: Sep. 15, 1980

[51] Int. Cl.[3] .......... A01K 31/20

[52] U.S. Cl. .......... 237/14; 62/78; 62/441; 128/1 B; 165/30; 422/104

[58] Field of Search .......... 237/14; 128/1 B; 422/104; 62/78, 441; 165/30

[56] References Cited

U.S. PATENT DOCUMENTS

| | | | |
|---|---|---|---|
| 3,102,777 | 9/1963 | Bedrosian et al. | 62/78 |
| 3,908,749 | 9/1975 | Williams | 165/30 |
| 4,014,178 | 3/1977 | Kells | 62/441 |
| 4,148,194 | 4/1979 | Kells | 62/441 |

FOREIGN PATENT DOCUMENTS

| | | |
|---|---|---|
| 835354 | 5/1960 | United Kingdom . |
| 1225962 | 3/1971 | United Kingdom . |
| 1443818 | 7/1976 | United Kingdom . |

*Primary Examiner*—Ronald C. Capossela
*Attorney, Agent, or Firm*—Ratner & Prestia

[57] ABSTRACT

An incubator apparatus comprising an air-tight, sealed compartment for providing an incubation chamber and a sealed control compartment for housing electronic control circuitry. The control compartment and the incubation chamber are sealed and insulated from each other by a wall. Temperature, humidity and gas content of the incubation chamber are controlled from the control compartment by way of sensors, conduits and controls coupled between the incubation chamber and control compartment. The electronic components are enclosed within sealed boxes, each box having all but one of its faces substantially positioned inside the control compartment and one face oriented to the outside, whereby the face is removable for providing easy access and removal of the electronic components. Removal is achieved without disturbing the environment inside the incubation chamber and control compartment.

7 Claims, 6 Drawing Figures

LABORATORY INCUBATOR CHAMBER SYSTEM

BACKGROUND OF THE INVENTION

A. Field of the Invention

This invention relates to incubating apparatus and specifically to incubators having an incubation compartment and a control compartment, and having control means sealed off from both compartments for permitting easy access, removal and rapid replacement of the control means without disturbing the environment inside both compartments.

B. Background Art

In the past, incubating apparatus have been made in which two separate compartments are provided, one being the incubation chamber and the other the control compartment. Gas, such as carbon dioxide, and water are placed inside the incubation chamber, and the gas volume, temperature and humidity are controlled from the control compartment. The apparatus requires a fan motor, several solenoid valves, control relays, and temperature and humidity sensors. Finally, electronic control circuits are also required to control the above.

The electronic control circuits are required to provide a high degree of accuracy, stability and reliability for the incubation chamber. When the electronic components are subjected, however, to a sudden temperature change, as when servicing is necessary, it is difficult to get the components back to their former equilibrium state.

It has been known to place the fan motor, the solenoid valves, the control relays and the electronic control circuits within the control compartment adjacent to the incubation chamber. This, however, has caused problems. The heat generated by the fan motor, the solenoid valves and relays has provided undesirable effects on the electronic control circuits. Electromagnetic radiation from these elements has also had undesirable effects on the electronic control circuits, as well as dust or dirt found within the control compartment. The dust, radiation and heat have degraded the reliability and operability of the electronic control circuits, since the circuits have been exposed within the control compartment.

For example, during operation the incubation chamber is allowed to reach a desired controlled steady state condition. However, if a problem exists requiring maintenance, the control compartment must be opened, thereby exposing the electronic components to the laboratory ambient environment which is possibly 20°-30° lower than the control compartment temperature. This, in turn, causes the electronic components to become unstable and upset the steady state condition being controlled in the incubator chamber where the environment must be controlled to an accuracy of a tenth of a degree or a tenth of a percent. The stress on the components and the instability during this period has resulted in extensive maintenance requirements, adding extensive down time and expense.

Another disadvantage of prior incubator apparatus has been the length of time required to clean and decontaminate the incubation chamber.

Therefore, an object of this invention is to provide for the removal of the electronic components from the control compartment without upsetting the steady state condition being controlled in the incubation chamber.

Another object of this invention is to provide for the removal of components from the control compartment without affecting the other components remaining in the control compartment.

Yet another object of this invention is to provide easy means for easy and rapid replacement of the control components without having to shut down the incubator apparatus.

Still another object of this invention is to provide easy means for decontamination and cleaning of the incubation chamber.

Yet another object of this invention is to provide easy means for removing the trays and sides of the incubation chamber without the need of tools.

SUMMARY OF THE INVENTION

A device comprising an air-tight, sealed compartment for providing an incubation chamber and a sealed control compartment for housing a plurality of control means. The incubation chamber and the control compartment are sealed and insulated from each other by a wall. The control means are coupled to the incubation chamber by way of sensor means and conduit means for providing temperature, humidity and gas variations to the incubation chamber. The control means are enclosed within sealed boxes, each box having all but one of its faces substantially positioned inside the control compartment and one face oriented to the outside, said face having removable means to provide easy access and removal of the control means without affecting the environment within the incubation chamber and the control compartment.

There is further included in the incubation chamber a first rack holder and an opposing second rack holder for providing support to a plurality of racks. The racks are slidable on U-shaped horizontal guides attached to the first and second rack holders. Means are provided for inserting and removing the rack holders and the racks. The first rack holder includes vertical air duct means for circulating air. Two of the racks have the uppermost and bottommost position within the incubation chamber provide air ducting means for the chamber. In this manner, air discharges through the horizontal space between the guides in laminar flow across the chamber to the vertical air duct means.

DESCRIPTION OF ILLUSTRATIVE EMBODIMENT

Figure 1:
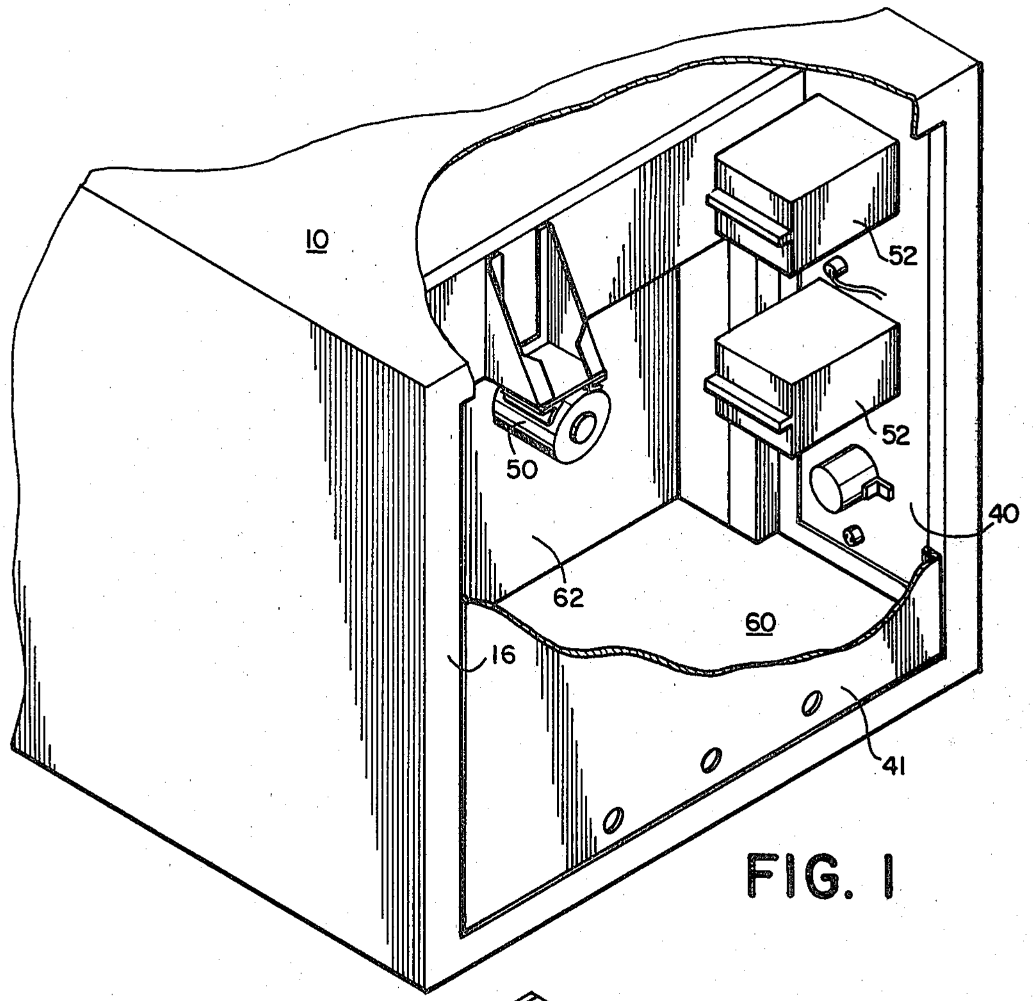
FIG. 1 is a perspective view of the control compartment of an incubating apparatus made in accordance with this invention.

Referring to FIGS. 1-5, there is shown incubator apparatus 10 having two compartments, control compartment 60 and incubation chamber 90. The two compartments are sealed off from each other by way of vertical wall 62, which is welded or otherwise secured in airtight engagement to the top and bottom horizontal surfaces of apparatus 10. The two compartments are box-like in shape having peripheral surface 16, constructed of steel or a suitable metal, extending horizontally across the top and bottom, and vertically across the sides and rear of apparatus 10.

Figure 4:
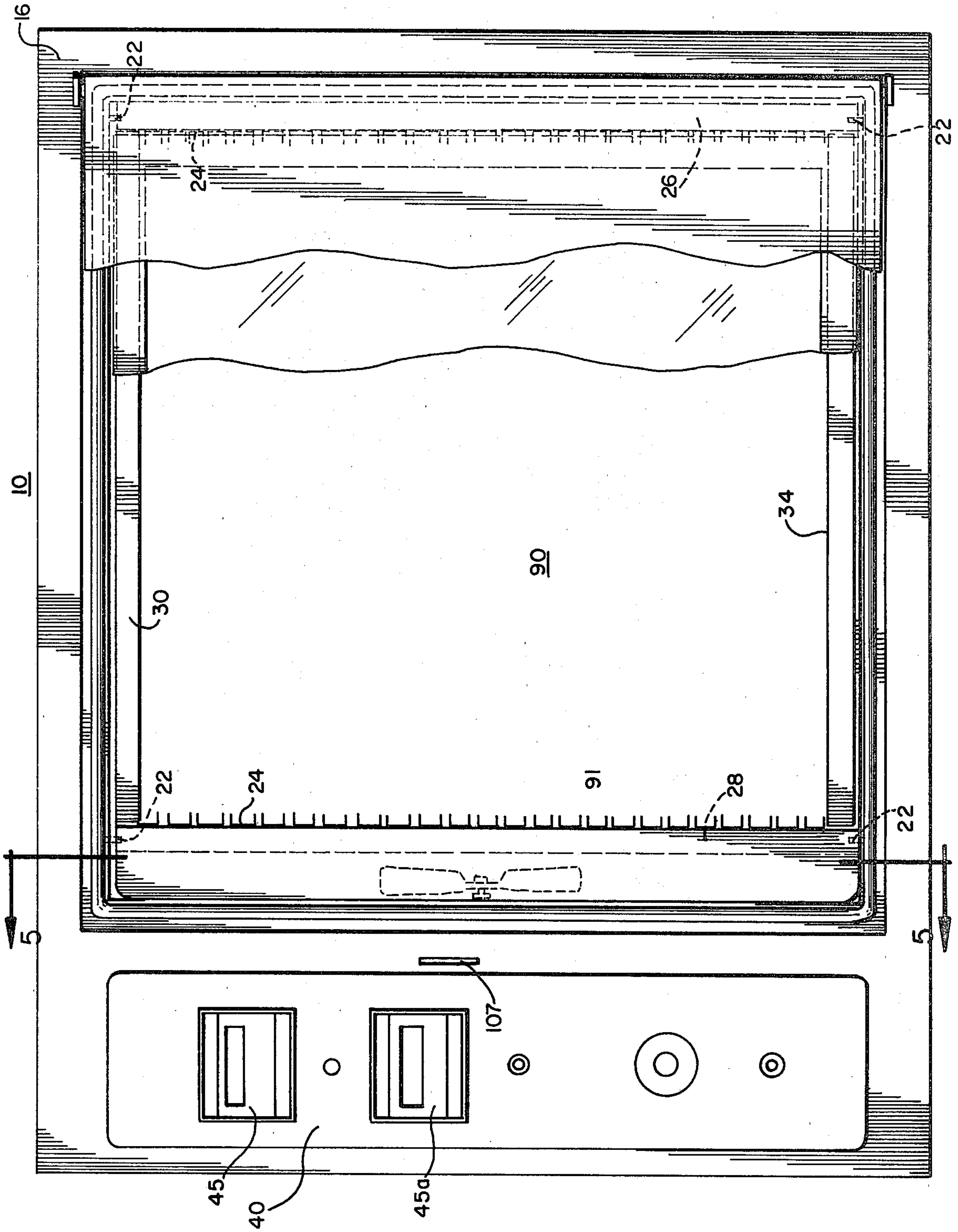
FIG. 4 is a front elevational view of the apparatus of FIG. 1.
Figure 5:
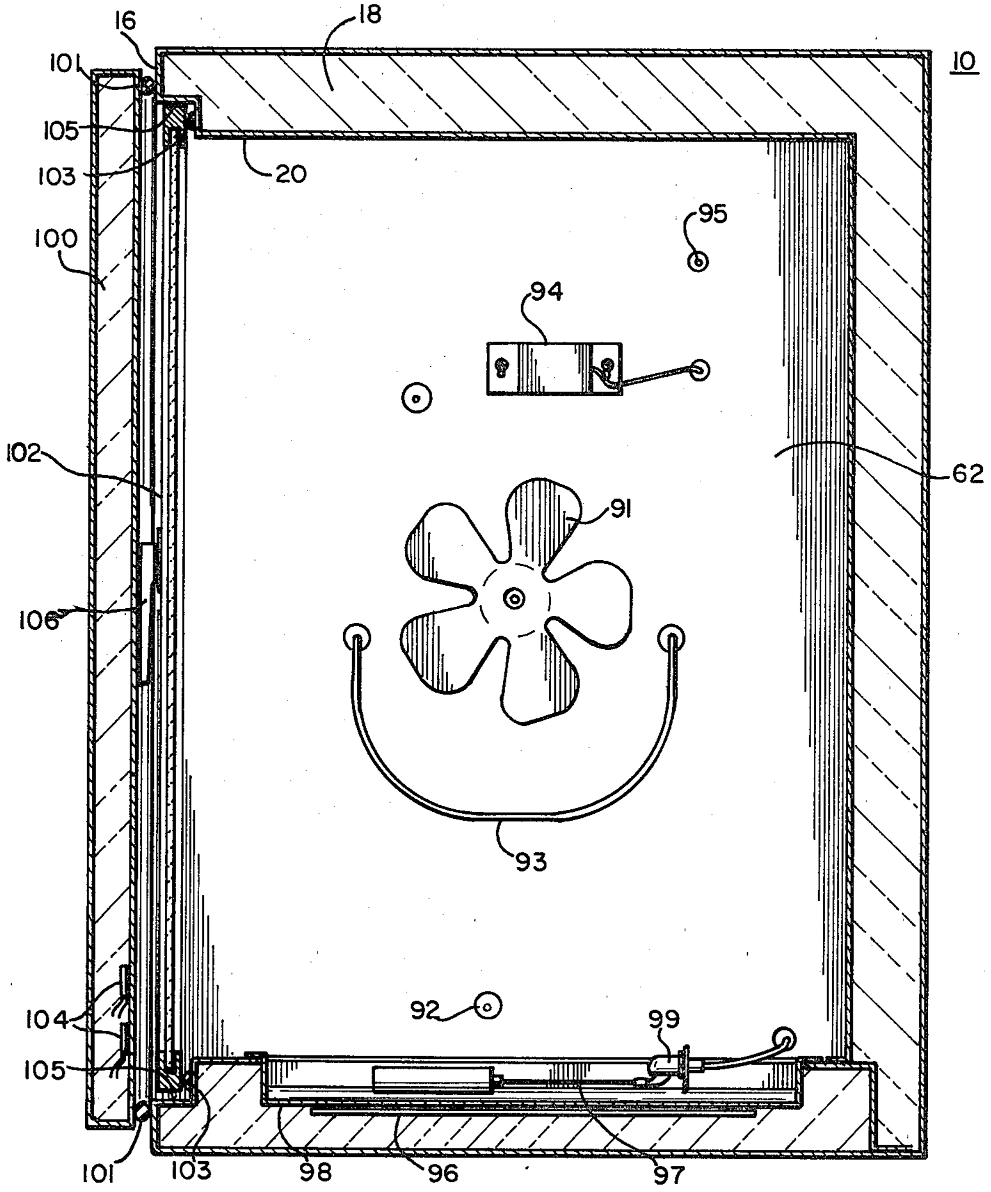
FIG. 5 is a view taken on the line of 5—5 of FIG. 4.

Access to control compartment 60 is provided by way of side panel 41 which is removably secured to peripheral surface 16. The front section of compartment 60 has a cover panel 40 with openings **40*a*,*b*. Access to incubation chamber 90 is provided by a dual arrangement, as shown in FIG. 5. Inside door 102 and outside door 100 are rotatably supported on hinges suitably fastened to peripheral surface 16. Inside door 102 is mounted with its edges located within step 105, said step having been carved from the top, bottom and sides of peripheral surface 16 in the forward portion of incubation chamber 90. Silicone gasket 103 is provided between inside door 102 and step 105 to provide an air tight seal for incubation chamber 90. The silicone gasket is resistant to deterioration from the effects of the atmosphere in the incubator. Outside door 100 is larger than inside door 102, completely covering the latter, and provides additional means for sealing incubation chamber 90. Vinyl gasket 101 is provided between outside door 100 and peripheral surface 16. Outside door 100 and inside door 102 may be forced closed by any conventional means. For example, FIG. 5 shows inside door 102 closed by means of a cam latching handle 106; outside door 100, for example, is force closed by a strong magnet mounted to engage said door, such as magnet 107 shown in FIG. 4**.

It will be understood that inside door 102 can be made of a transparent substance, such as glass, so that the inside of incubation chamber 90 may be observable without the need for opening inside door 102; only outside door 100 need to be opened. Furthermore, since inside door 102 provides an air tight seal, the opening of outside door 100 does not disturb the environment being controlled inside incubation chamber 90. To prevent condensation on inside door 102 and to insure visibility through the door, two heating elements 104 are provided within outside door 100 as shown in FIG. 5. Such heating elements can be, for example, electrical heater wires coiled in suitable silicon rubber pad mounting plates. The ends of the heater wires are preferably brought out of the door through its bottom in any suitable fashion so that electrical connections may be made thereto.

Figure 3:
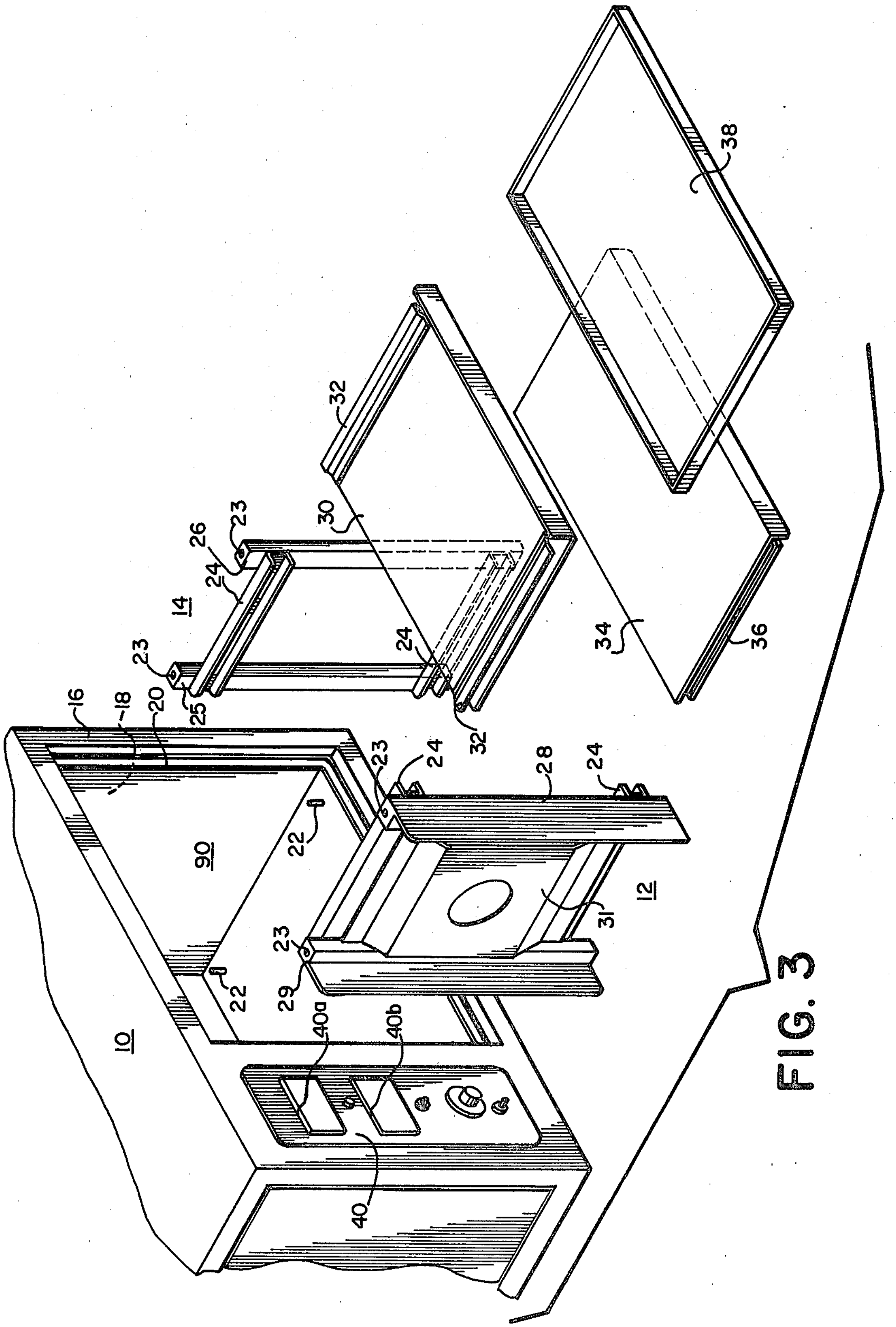
FIG. 3 is a perspective view of the incubation chamber for the apparatus of FIG. 1 with sidewalls and shelf-slides removed.

Inside incubation chamber 90 and in abutment with peripheral surface 16 and vertical wall 62 are formed two layers, 18 and 20, as shown in FIG. 3. Layer 18 is formed of a heat insulating material, such as fiberglass, and layer 20 is formed of stainless steel. With layer 18 comprised of heat insulating material, the interior of the incubation chamber is thermally insulated from its external atmosphere. The innermost stainless steel layer 20 provides a good reflection medium for even heat distribution inside the chamber.

As mentioned earlier, control compartment 60 is sealed and separated from incubation chamber 90. FIG. 1 shows a perspective view of the inside of the control compartment. There has been illustrated panel 40 having openings or windows **40*a*,*b* to receive instruments for the control and measurement of various conditions inside the incubation chamber. Such instruments may widely differ in width and height. For example, two rectangular boxes 52, 52*a* are shown mounted through respective openings 40*a*,*b* in panel 40. Boxes 52, 52*a* each contain control units 45, 45*a* which have electronic control circuitry that may, for example, control the temperature or the amount of carbon dioxide in incubation chamber 90, as described in detail with respect to FIG. 6. Since boxes 52, 52*a* and respective units 45, 45*a* are similar only one of them, box 52, and unit 45 will be described in detail. When mounted through openings in panel 40, box 52** has all but one of its faces substantially positioned inside the control compartment and one face, the front panel, oriented to the outside.

Figure 2:
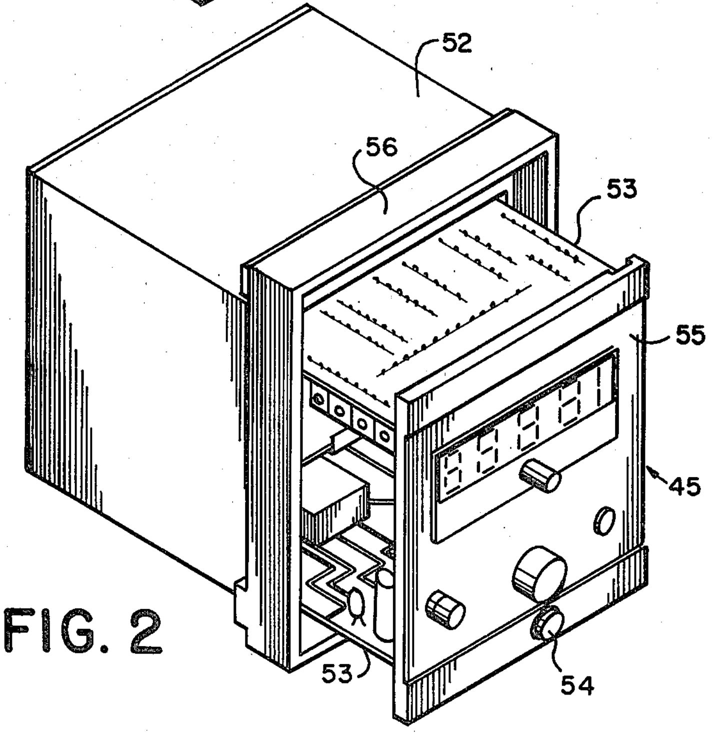
FIG. 2 is a perspective view of the box enclosing electronic control circuitry used with the apparatus of FIG. 1.

Referring to FIG. 2, there is shown rectangular sealed box 52 for unit 45 which comprises two printed circuit boards 53 perpendicularly mounted on face 55. Face 55 provides appropriate displays and controls required for the electronic components. Through guides provided inside box 52, printed circuit boards 53 can be guided to engage two printed circuit board electrical connector receptacles inside box 52 (not shown). When the circuit boards are engaged with their respective connectors, face 55 is in abutment with frame 56, thus completely sealing the electronic components inside box 52. Screw 54 is provided to lock face 55 onto frame 56. Electrical wire distribution is made in a conventional manner from the receptacles through the rear of sealed box 52 (not shown). Face 55 together with printed circuit boards 53 forming control unit 45 are easily removable from box 52.

Thus, if control unit 45 or control unit **45*a*** develops a fault it may easily and readily be replaced with a spare unit maintained in reverse by the user. The defective unit is removed and a spare unit inserted while the incubator apparatus continues to operate for its intended purpose. The user does not have to shut down the incubator and wait for a service technician to arrive, identify a particular fault and repair it if possible. By the user maintaining on hand spare precalibrated units to exactly replace operating units, down time and expensive service calls are effectively avoided.

Furthermore, since the circuit boards are completely sealed off from control compartment 60 by way of the faces of box 52, removal of unit 45 does not affect the interior of control compartment 60. This results in longer lasting control components, since removal of any one or all of circuit boards 53 does not perturbate the steady state temperature existing within control compartment 60 and does not affect the stability of the chamber environment.

Another advantage of the incubator apparatus made in accordance with the present invention is the ease with which the interior of incubation chamber 90 can be decontaminated and cleaned. Referring to FIG. 3, there is shown left rack holder 12 and right rack holder 14. Left rack holder 12 includes two vertical members 28 and 29. Horizontal guides 24 having U-shapes are spot welded to members 28 and 29. Right rack holder 14 comprises two vertical members 25 and 26 having U-shaped horizontal guides 24 spot welded to said members. It will be understood that several horizontal guides are spot welded along vertical members 25, 26, 28 and 29 for receiving a plurality of rack trays on which the incubating samples are placed. One such rack 38 is shown constructed of metal or steel, having a flat portion with small horizontal strips spot welded at its peripheral edges. The horizontal strips have a width smaller than the width of horizontal guides 24, so that rack tray 38 can slide within guides 24.

Also shown in FIG. 3 are top rack 30 and bottom rack 34. Rack 30 comprises a substantially flat portion bending 90° upwardly at the forward location of the incubation chamber and having two guide strips 32 spot welded to the sides of said flat portion. Rack 34 similarly comprises a substantially flat portion bending 90° downwardly at the forward location of the incubation chamber and having two guide strips 36 spot welded to the sides of said flat portion. By sliding racks 30 and 34 within the uppermost and bottommost U-shaped guides 24, respectively, each rack forms a ducting plenum, as shown in FIG. 4. Additionally, air conditioning guide 31, which is welded to left rack holder 12 at the uppermost and bottommost U-shaped guides 24, forms a vertical air ducting channel and houses fan-blades 91. In this manner, air is circulated from air conditioning guide 31 across the top of the chamber to the right side wall, and across the bottom of the chamber back to air conditioning guide 31.

It will be noted that right rack holder 14 and left rack holder 12 are each held in by four pins 22, two of which are welded to the chamber floor and two to the top. Pins 22 are stainless steel and are made to fit through holes 23 of vertical members 24, 26, 28 and 29. In operation, rack holders 12 and 14 are placed inside the chamber and top holes 23 are aligned and pushed up to engage top pins 22, thereby clearing bottom pins 22. Then bottom holes 23 are aligned with bottom pins 22, and rack holders 12 and 14 are permitted to drop by gravity to engage said bottom pins. In this manner rack holders 12 and 14, ducting racks 30 and 34, and rack trays 38 can be easily inserted and removed from incubation chamber 90. No tools are necessary.

Figure 6:
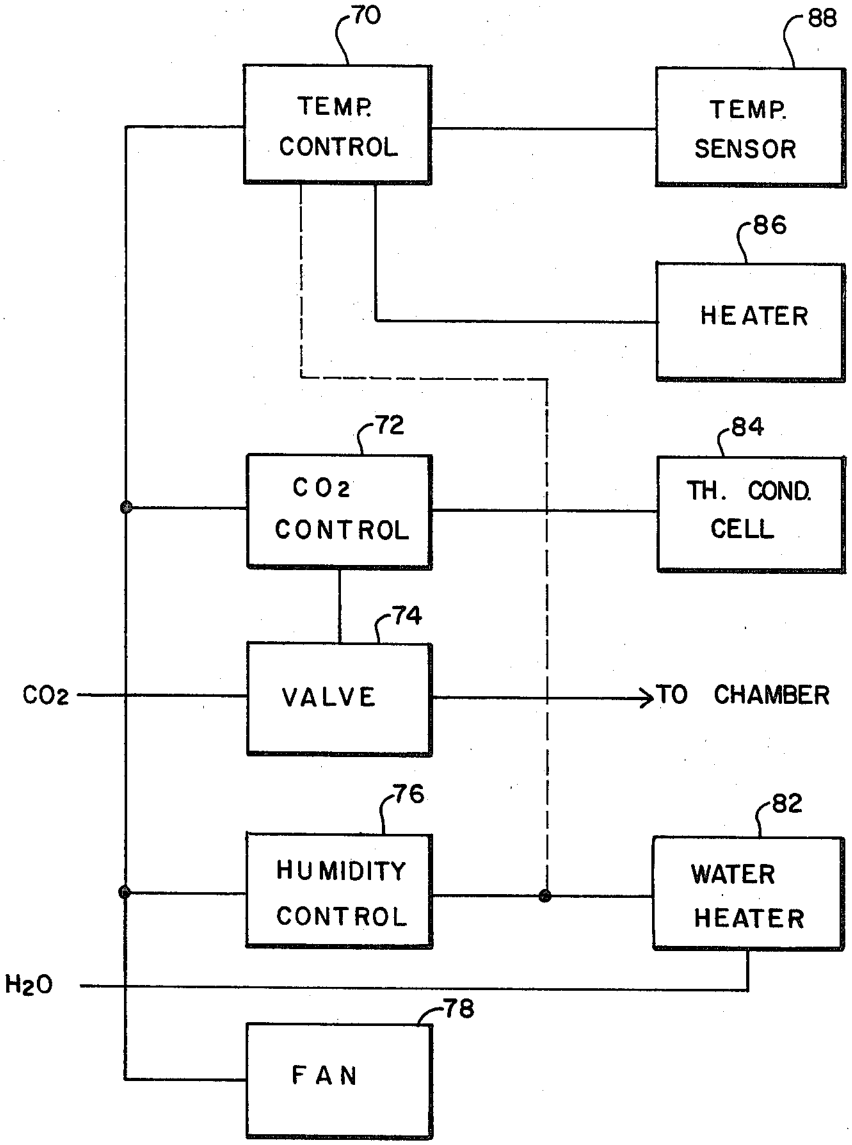
FIG. 6 is a block diagram showing one example of the controls with the apparatus of FIG. 1.

By way of example, FIG. 6 illustrates a block diagram of typical controls for an incubator apparatus. Shown are temperature control means 70 sensing the temperature within the incubation chamber by way of conventional RTD sensor 88 and controlling the temperature therein by way of conventional heater 86. Also shown are $CO_2$ control means 72 sensing the level of $CO_2$ within the chamber by way of a conventional thermal conductivity cell, TCC 84, and controlling the flow of $CO_2$ to the chamber by way of conventional solenoid valve 74. Further shown are humidity control means 76 controlling the humidity inside the chamber by way of heater 82 which is capable of evaporating water from a reservoir located inside the chamber. Finally, power means 78 is shown supplying power to fan motor 80 and the rest of the system.

FIG. 5 illustrated, by way of example, the locations of some of the controls and sensors described earlier with respect to FIG. 6. Fan-blades 91 of motor 50 (FIG. 1) are coupled by a motor shaft through vertical wall 62. Also mounted on wall 62 are heater element 93, which heats the atmosphere inside the chamber; $CO_2$ inlet valve 92, which provides chamber inlet means for the $CO_2$; thermal conductivity cell 94, which sense the level of $CO_2$ inside the chamber; and temperature sensor 95, which sense temperature inside the chamber. Also mounted through wall 62 is water inlet valve 99 which is controlled by way of pan-float assembly 97. Water from inlet valve 99 is permitted to flow into reservoir 98 located at the bottom of the chamber. Finally, located below reservoir 98 is heating element 96, which controls the water evaporation inside the chamber. It will be understood that the above described sensors, valves and heaters suitably connected in a conventional manner, to various control means located inside control compartment 60 by way of wires or conduit brought out through wall 62.

While only one embodiment of the invention is described, it will be understood to those skilled in the art that other embodiments may be employed within the scope of the following claims.

What is claimed is:

1. A device comprising an air tight, sealed compartment for providing an incubation chamber and a sealed control compartment for housing a plurality of control means, said incubation chamber and said control compartment being sealed and insulated from each other by a vertical wall, said control means being coupled to said incubation chamber by way of sensor means and conduit means for providing temperature, humidity and gas variations to said incubation chamber, wherein at least one of said control means is enclosed within a sealed box, said box having all but one of its faces substantially positioned inside said control compartment and one face oriented to the outside, said face having removable means to provide easy access and removal of said control means without affecting the environment within said incubation chamber and said control compartment.

2. The device of claim 1 wherein said control means includes electronic printed circuit boards, said boards positioned perpendicularly to and engaged with said outside face at one end and engaged with printed circuit board receptacles at the other end.

3. The device of claim 2 wherein said circuit boards are removable together with said outside face.

4. The device of claim 1 wherein said sensor means and said conduit means includes an $H_2O$ inlet valve, a $CO_2$ inlet valve, a thermal conductivity cell and a temperature sensor; said sensor means and said conduit means mounted on said vertical wall facing said incubation chamber, and said sensor means coupled to said control means by way of conducting wires.

5. The device of claim 1 wherein said box includes a rectangular frame surrounding said box for providing mounting means to the front panel of said control compartment.

6. A device comprising an air tight, sealed compartment for providing an incubation chamber and a sealed control compartment for housing a plurality of control means, said control compartment and said incubation chambers being sealed and insulated from each other by a vertical wall, said incubation chamber includes first rack holder means and an opposing second rack holder means for providing support to a plurality of racks, said racks being slidable on U-shaped horizontal guides attached to said first and second rack holder means, means for inserting and removing said rack holders and said racks, said first rack holder means including vertical air duct means for circulating air, two of said racks having the uppermost and bottommost position within said incubation provide air ducting means for said chamber and thereby air discharges through the horizontal space between said guides in laminar flow across said chamber to said vertical air duct means.

7. The device of claim 6 wherein said rack holder means are in engagement with vertical pins, said pins being rigidly secured at one end to the top and bottom surface of said incubation chamber and freely positioned at the other end for receiving and holding said rack holder means.

* * * * *